United States Patent
Kovalsky et al.

[11] Patent Number: 5,885,059
[45] Date of Patent: Mar. 23, 1999

[54] COMPOSITE TIP CAP ASSEMBLY FOR A HELICOPTER MAIN ROTOR BLADE

[75] Inventors: David A. Kovalsky, Huntington; Corey D. Jones, Prospect; Christopher J. Damon, Cheshire; Leon M. Meyer, Torrington, all of Conn.

[73] Assignee: Sikorsky Aircraft Corporation, Stratford, Conn.

[21] Appl. No.: 772,680

[22] Filed: Dec. 23, 1996

[51] Int. Cl.$^6$ .................................................. B64C 27/473
[52] U.S. Cl. ........................ 416/224; 416/226; 416/228; 416/230; 416/233
[58] Field of Search .................... 416/224, 226, 416/228, 230, 233, 237, 241 A

[56] References Cited

U.S. PATENT DOCUMENTS

| | | | |
|---|---|---|---|
| 2,866,616 | 12/1958 | Stalker | 416/233 |
| 2,884,078 | 4/1959 | Stamm et al. | 416/226 |
| 3,095,180 | 6/1963 | Clarke et al. | 416/233 |
| 3,528,753 | 9/1970 | Dutton et al. | 416/230 |
| 3,721,507 | 3/1973 | Monteleone . | |
| 3,782,856 | 1/1974 | Salkind et al. . | |
| 3,883,267 | 5/1975 | Baudier et al. | 416/230 |
| 3,999,888 | 12/1976 | Zincone . | |
| 4,022,547 | 5/1977 | Stanley | 416/241 A |
| 4,051,289 | 9/1977 | Adamson | 416/230 |
| 4,120,610 | 10/1978 | Braswell et al. . | |
| 4,324,530 | 4/1982 | Fradenburgh et al. . | |
| 4,621,980 | 11/1986 | Reavely et al. | 416/230 |
| 5,129,787 | 7/1992 | Violette et al. | 416/226 |
| 5,320,494 | 6/1994 | Reinfelder et al. . | |
| 5,542,820 | 8/1996 | Eaton et al. . | |

FOREIGN PATENT DOCUMENTS

2154286  9/1985  United Kingdom .................... 416/233

*Primary Examiner*—Christopher Verdier
*Attorney, Agent, or Firm*—Terrance J. Radke

[57] ABSTRACT

A composite tip cap assembly for a helicopter main rotor blade includes a composite main fairing, a unitary composite rib detail internally integrated in combination with the composite main fairing, a composite closure fairing bonded in combination with the composite main fairing, and an abrasion strip bonded in combination with the composite main fairing and the composite closure fairing.

13 Claims, 10 Drawing Sheets

COMPOSITE TIP CAP ASSEMBLY FOR A HELICOPTER MAIN ROTOR BLADE

TECHNICAL FIELD

The present invention relates to helicopter main rotor blades, and more particularly, to a composite tip cap assembly for a helicopter main rotor blade.

BACKGROUND OF THE INVENTION

A helicopter main rotor assembly, and in particular the main rotor blades thereof, is subjected to a variety of operational forces—aerodynamic, inertial, and centrifugal. In particular, main rotor blades must be designed to accommodate various dynamic loads such a bending loads, flapwise (out-of-plane) and chordwise (in-plane) loads, axial loads (centrifugal), and torsional loads. Such dynamic loads subject the main rotor blades to varying degrees of stresses/strains.

In particular, the extreme outboard end or tip of the main rotor blade is subjected to the greatest stresses/strains due to aerodynamic forces, and concomitantly experiences the greatest structural degradation due to wear and abrasion (due to the high rotational velocity of the main rotor blade tip), during operation of the helicopter main rotor assembly. In addition, the extreme outboard end of the main rotor blade has the highest probability of experiencing structural damage as a result of striking external objects.

Accordingly, it is well known in the helicopter art to provide a sacrificial or removable tip cap at the extreme outboard end of a helicopter rotor blade. Representative examples of tip caps for helicopter rotor blades are presented in U.S. Pat. No. 4,120,610 which discloses an end tip cap secured to the nose spar of a main rotor blade; and U.S. Pat. No. 5,320,494 which describes a replaceable tip portion for a main rotor blade comprised of a composite skin bonded to an internal honeycomb core and a composite tip cap attached to the tip portion.

Figure 1A:
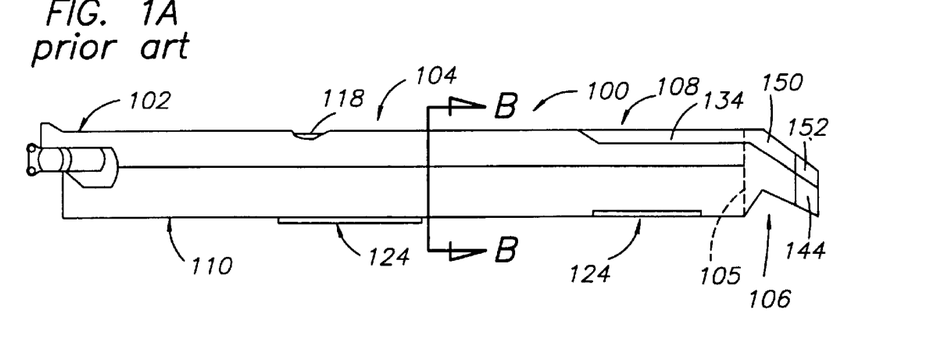
FIG. 1A is a top plan view of an exemplary main rotor blade for a helicopter.
Figure 1B:
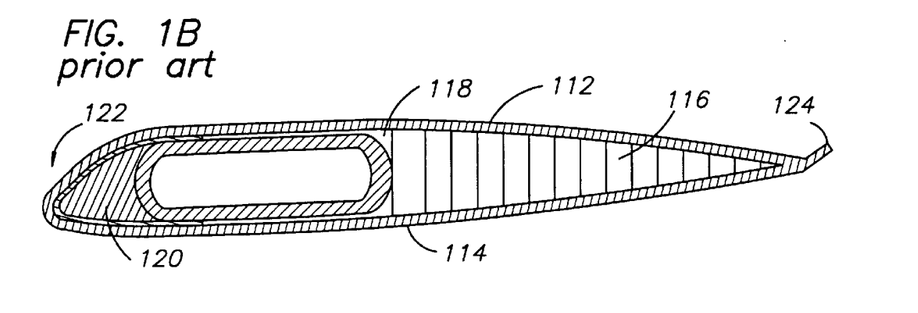
FIG. 1B is a cross-sectional view of the helicopter main rotor blade of FIG. 1A taken along line 1B—1B thereof.
Figure 1C:
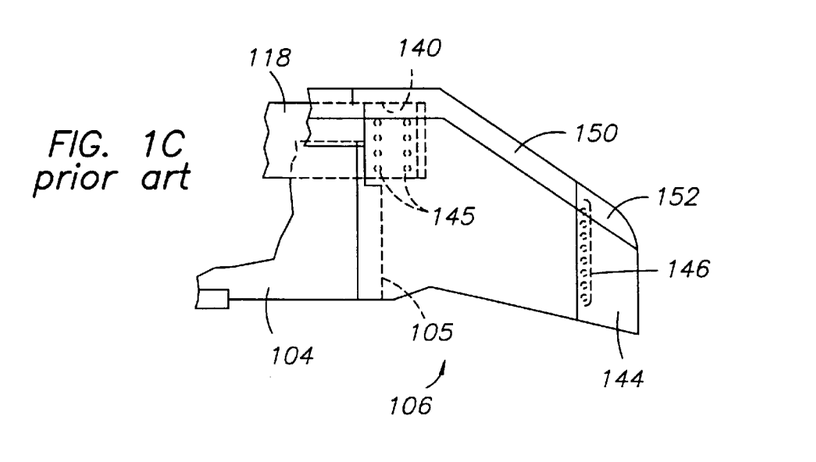
FIG. 1C is an enlarged top plan view of the replaceable tip segment of the helicopter main rotor blade of FIG. 1A.

FIGS. 1A–1C illustrate an exemplary main rotor blade 100 for a helicopter as described in U.S. Pat. No. 5,542,820. The main rotor blade 100 comprises an inboard segment 102 configured for mounting the main rotor blade 100 to the helicopter rotor hub assembly (not shown), an intermediate segment 104, and a replaceable tip segment 106 (reference numeral 105 identifies the demarcation between the outboard end of the intermediate segment 104 and the replaceable tip segment 106). The inboard, intermediate, and tip segments 102, 104, 106 in combination define the span of the main rotor blade 100. The main rotor blade 100 has a leading edge 108 and a trailing edge 110, which in combination define the chord of the main rotor blade 100.

The inboard and intermediate regions 102, 104 of the main rotor blade 100 are fabricated from upper and lower composite skins 112, 114 that define the upper and lower aerodynamic surfaces of the blade 100, respectively, a honeycomb core 116, a spar 118, one or more counterweights 120, a leading-edge sheath 122, and adjustable trim tabs 124. The upper and lower composite skins 112, 114 are bonded to the honeycomb core 116, which functions as a low weight, structural stiffening member between the composite skins 112, 114. The spar 118 is a prefabricated component (either from composite material(s) or a metallic material such as titanium) and functions as the primary structural member of the main rotor blade 100, reacting the torsional, bending, shear, and centrifugal dynamic loads developed in the blade 100 during operation of the helicopter main rotor assembly.

One or more counterweights 120 are bonded to the spar 118 to balance the main rotor blade 100 statically and dynamically. The leading-edge sheath 122 is a prefabricated hybrid component fabricated from composite materials, e.g., woven fiberglass material embedded in a suitable resin matrix, and abrasion-resistive materials, e.g., titanium and nickel strips. The sheath 122 has a generally C-shaped configuration that defines the leading edge 108 of the main rotor blade 100 from the inboard end of the inboard segment 102 to the outboard end of the intermediate segment 104. The leading-edge sheath 122, and in particular the abrasion-resistive strips, provide abrasion protection for the leading edge 108 of the main rotor blade 100. The leading-edge sheath 122 also provides control of airfoil tolerances of the main rotor blade 100.

The replaceable tip segment 106 of the main rotor blade 106 has a defined aerodynamic configuration, e.g., rearward sweep, taper, and/or anhedral, to enhance the aerodynamic performance of the main rotor blade 100 and the main rotor assembly. The replaceable tip segment 106 comprises upper and lower composite skins bonded in combination with a honeycomb core. A recess 140 is formed in the honeycomb core of the replaceable tip segment 106, the recess 140 having dimensions slightly greater than the external dimensions of the spar 118. The replaceable tip segment 106 is attached to the spar 118 by bonding using an adhesive material such as epoxy film adhesive applied to the wall(s) defining the recess 140 and the external surface of the spar 118. Further, fasteners 145, e.g., threaded fasteners, may be used to enhance the attachment of the replaceable tip segment 106 in combination with the intermediate segment 104. Replaceable tip segments as described hereinabove are removable at the depot level, which greatly facilitates timely repair or replacement thereof.

The described embodiment of the main rotor blade 100 further includes a composite tip cap 144, e.g., graphite fibers embedded in a suitable resin matrix, that is secured, e.g., by fasteners 146, in combination with the outboard end of the replaceable tip segment 106. Alternatively, the tip cap 144 may be fabricated from a metallic material such as titanium or aluminum. The tip cap 144 is replaceable at the field level, which minimizes the time and costs associated with the replacement thereof. The replaceable tip segment 106 includes an abrasion strip 150 and the composite tip cap 144 includes an abrasion strip 152. The abrasion strips 150, 152, which are typically formed from an abrasive-resistant metallic material such as nickel, in combination define the leading edge of the replaceable tip segment 106.

The Assignee of the present invention, Sikorsky Aircraft Corporation, currently provides replaceable tip cap assemblies for its UH-60 BLACK HAWK® and SH-60 SEAHAWK® (BLACK HAWK and SEAHAWK are registered trademarks of the Sikorsky Aircraft Corporation) helicopters. These replaceable tip cap assemblies include a main fairing, internal ribs, a composite closure fairing, and a nickel abrasion strip. The main fairing is fabricated from aluminum and has a defined aerodynamic configuration, i.e., upper and lower airfoils having aerodynamic surfaces, a leading edge, and a trailing edge. The internal ribs comprise a plurality of aluminum C-shaped members that are disposed within the cavity of the main fairing and secured to the upper and lower airfoils by means of aerospace fasteners. The composite closure fairing, which has an aerodynamic configuration, is fabricated from a KEVLAR®-based composite material (KEVLAR is a registered trademark of E.I. du Pont de Nemours & Co., Wilmington, Del. for an aromatic polyamide fiber of extremely high tensile strength)

and bonded in combination with the main fairing using a suitable adhesive. The nickel abrasion strip is bonded in combination with the leading edges of the main and closure fairings. The aluminum tip cap assembly is bolted in combination with the outboard end of the main rotor blade.

While the aluminum tip cap assemblies described in the preceding paragraph are functionally effective for their designed purpose, such prior art tip cap assemblies do have some limitations. For example, each of these aluminum tip cap assemblies is comprised of sixteen separate components such that the manufacture and assemblage of these aluminum tip cap assemblies is both time consuming and labor intensive. In particular, the integration of the individual C-shaped rib members in combination with the main fairing is particularly time consuming and labor intensive, requiring in excess of ninety aerospace fasteners to secure the individual C-shaped rib members in combination with the main fairing. In addition, the main fairing is susceptible to fatigue cracking as a result of the high aerodynamic loading to which the tip cap assemblies are subjected during operation of the main rotor assembly such that the aluminum tip cap assemblies must be regularly inspected and replaced.

A need exists to provide a tip cap assembly for helicopter main rotor blades that is easier to manufacture and assemble, i.e., that is more reproducible, and is more cost effective that the prior art aluminum tip cap assemblies described in the preceding paragraphs. Such a tip cap assembly should have a design configuration that makes it compatible as a retrofit item for the aluminum tip cap assemblies currently utilized in UH-60 BLACK HAWK® and SH-60 SEAHAWK® helicopters.

DISCLOSURE OF THE INVENTION

One object of the present invention include providing a composite tip cap assembly for a helicopter main rotor blade that includes a unitary composite rib detail.

This and other objects of the present invention are provided by a composite tip cap assembly for a helicopter main rotor blade that comprises a composite main fairing, a unitary composite rib detail internally integrated in combination with said composite main fairing, a composite closure fairing integrated in combination with said composite main fairing, and an abrasion strip integrated in combination with said composite main fairing and said composite closure fairing.

BRIEF DESCRIPTION OF THE DRAWINGS

A more complete understanding of the present invention and the attendant features and advantages thereof may be had by reference to the following detailed description when considered in conjunction with the accompanying drawings wherein.

BEST MODES FOR CARRYING OUT THE INVENTION

Some of the drawings used in conjunction with the following detailed description include radial station reference lines to facilitate a more complete understanding of the components comprising a composite tip cap assembly according to the present invention and the structural interrelationships between such components. One skilled in the art will appreciate that such radial stations are referenced from the center of rotation of a helicopter main rotor hub (not shown).

Figure 2A:
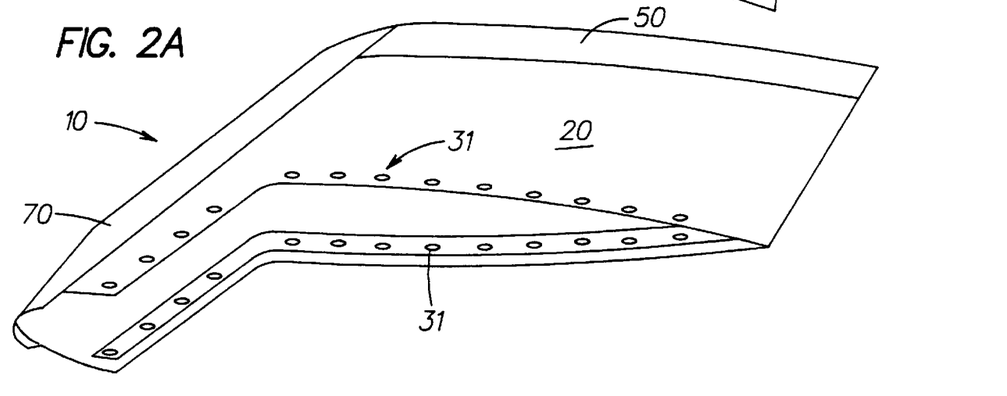
FIG. 2A is a perspective view of a composite tip cap assembly according to the present invention.
Figure 2B:
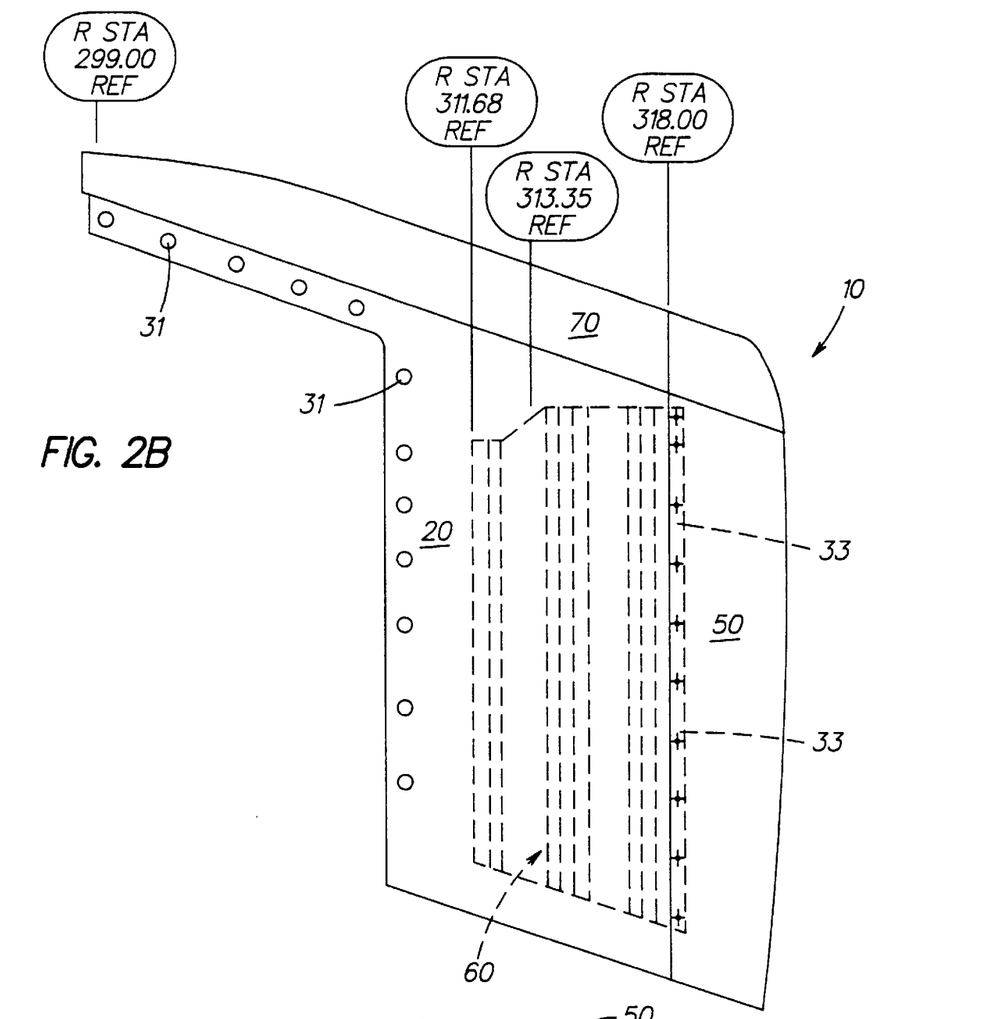
FIG. 2B is a bottom plan view of the composite tip cap assembly of FIG. 2A.

Referring now to the drawings wherein like reference numerals identify corresponding or similar elements throughout the several views, FIGS. 2A, 2B are a schematic perspective view and an upper plan view, respectively, of a composite tip cap assembly 10 according to the present invention. The composite tip cap assembly 10 has a structural and functional design configuration that makes the composite tip cap assembly 10 a replacement item for the aluminum tip cap assemblies described hereinabove that are currently utilized in the UH-60 BLACK HAWK® and SH-60 SEAHAWK® helicopters manufactured by Sikorsky Aircraft Corporation.

The composite tip cap assembly 10 comprises a composite main fairing 20, a composite closure fairing 50, a unitary composite rib detail 60, and an abrasion strip 70. The composite tip cap assembly 10 has an aerodynamic configuration of a type commonly used on helicopter main rotor blades and such aerodynamic configuration may include any selected combination of rearward sweep, taper, and/or anhedral. The explicit aerodynamic configuration of the composite tip cap assembly 10 is not a claimed feature of the present invention, and, therefore, is not described in specific detail.

The constituent components comprising the embodiment of the composite tip cap assembly 10 (excepting the abrasion strip 80) described in further detail hereinbelow are fabricated from composite material in the form of composite prepregs. Composite prepregs are formed from woven fibrous cloth, yarn, or fiber tow comprised of a matrix of orientated fibrous material such as graphite, aramids, e.g., KEVLAR®, boron, fiberglass or the like, which is impregnated with a predetermined amount of epoxy, phenolic, or other similar organic resinous material. The organic resin impregnated composite material is staged to form a "tacky" composite material, i.e., prepreg. Composite prepregs in the tacky condition are handled and processed in the various lay-up phases for forming the components of the composite tip cap assembly 10 according to the present invention.

For the described embodiment of the composite tip cap assembly 10, the composite prepregs are formed of fibrous graphite material embedded in a suitable resin matrix. Graphite-based composite materials were selected for the present application inasmuch as such materials possess good strain allowables and a high stiffness-to-weight ratio. An exemplary graphite-based composite material having utility for the present invention is IM7G/8552, which is commercially available from Hercules Inc., Wilmington, Del.

The graphite-based composite prepregs utilized to fabricate the components of the composite tip cap assembly 10 according to the present invention are unidirectional plies (in tape form) and plain weave plies as described hereinbelow in further detail for each component. The unidirectional plies have a nominal ply thickness of approximately 0.01524 centimeters (0.006 inches) and the plain weave plies have a nominal ply thickness of about 0.019 centimeters (0.0075 inches).

The composite main fairing 20, which is illustrated in FIGS. 3, 3A–3E, is defined by an upper airfoil 22, a lower airfoil 24, a leading edge 26, a trailing edge 28, an inboard integration region 30, and an outboard integration region 32. The outer mold line (OML) surfaces of the upper and lower airfoils 22, 24 define the aerodynamic configuration of the composite main fairing 20, and the leading and trailing edges 26, 28 in combination define the chord $C_{L20}$ (see FIGS. 3C, 3D) of the composite main fairing 20. The inner mold line (IML) surface of the inboard integration region 30 has a configuration that is complementary to the OML surface of the outboard end of a helicopter main rotor blade (not shown). The inboard integration region 30 includes a plurality of apertures 31 (shown in phantom in FIG. 3—see FIGS. 2A, 2B) that are used for securing (by bolted connections) the composite tip cap assembly 10 in combination with the outboard end of the helicopter main rotor blade. The OML surface of the outboard integration region 32 has a configuration that is complementary to the composite closure fairing 50. The outboard integration region 32 may optionally include a plurality of alignment apertures 33 (shown in phantom in FIGS. 2B, 3) for aligning the outboard end of the unitary composite rib detail 60 internally within the composite main fairing 20 as discussed in further detail hereinbelow.

Figure 3:
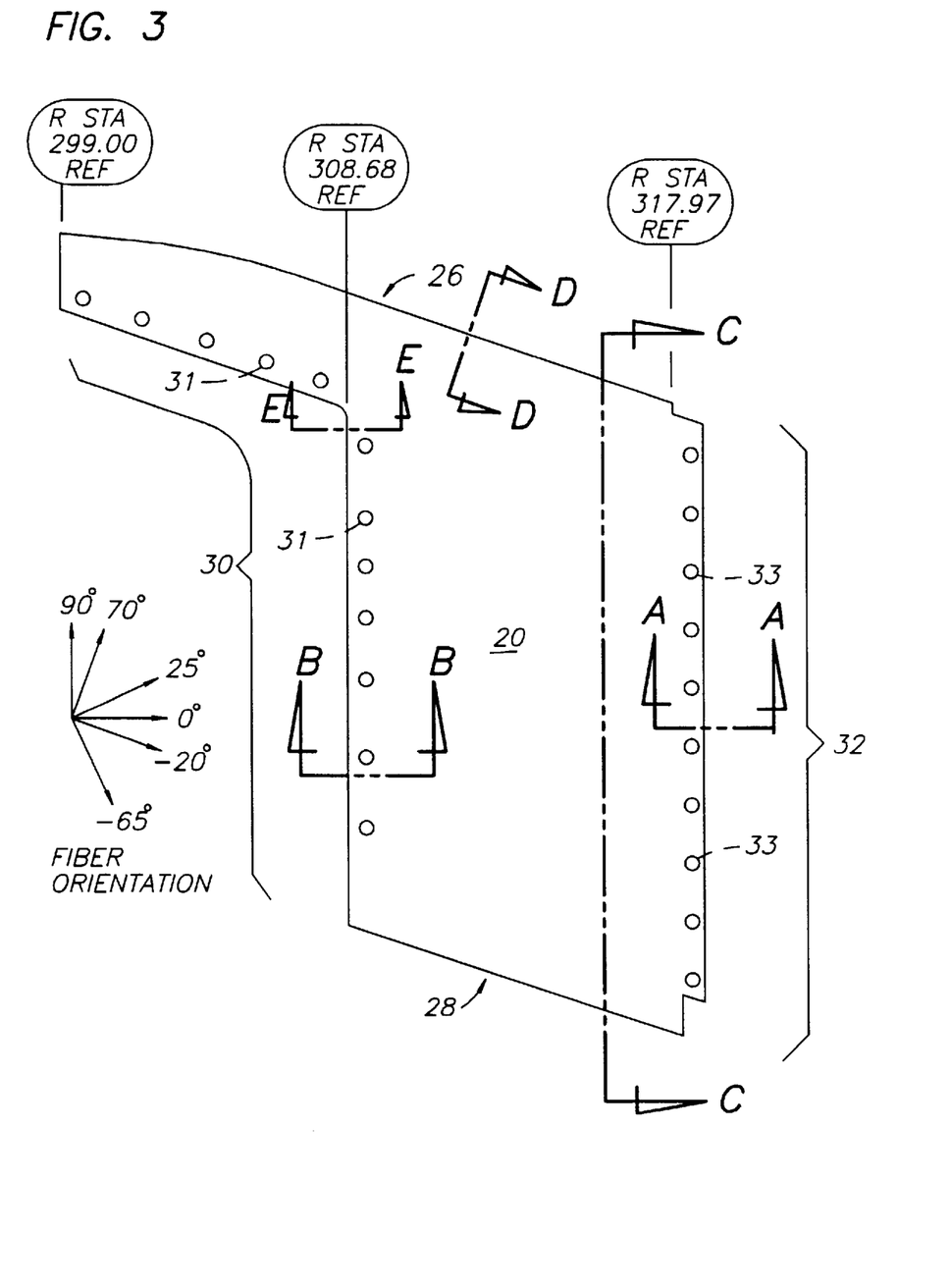
FIG. 3 is a plan view of the upper airfoil surface of the composite main fairing of the composite tip cap assembly of FIGS. 2A, 2B. Also shown in FIG. 3 is a schematic illustrating the fiber orientations of the unidirectional plies and plain weave plies forming the composite main fairing (fiber orientations are referenced to the feathering axis of the helicopter main rotor blade).
Figure 3A:
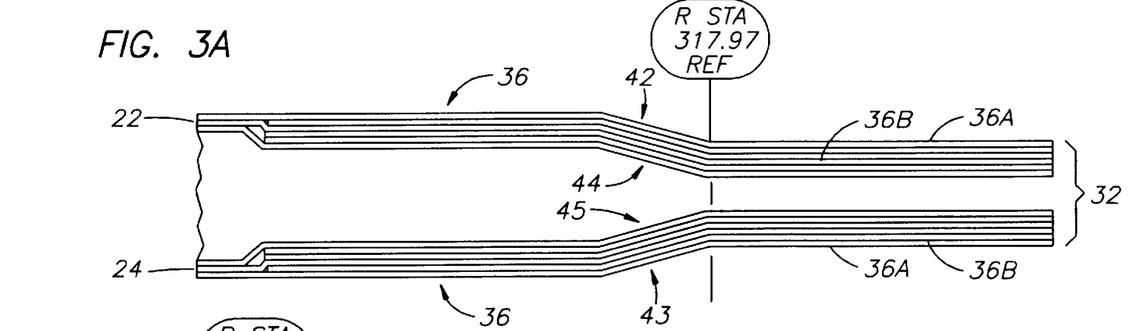
FIG. 3A is a cross-sectional view taken along line A—A of FIG. 3.
Figure 3B:
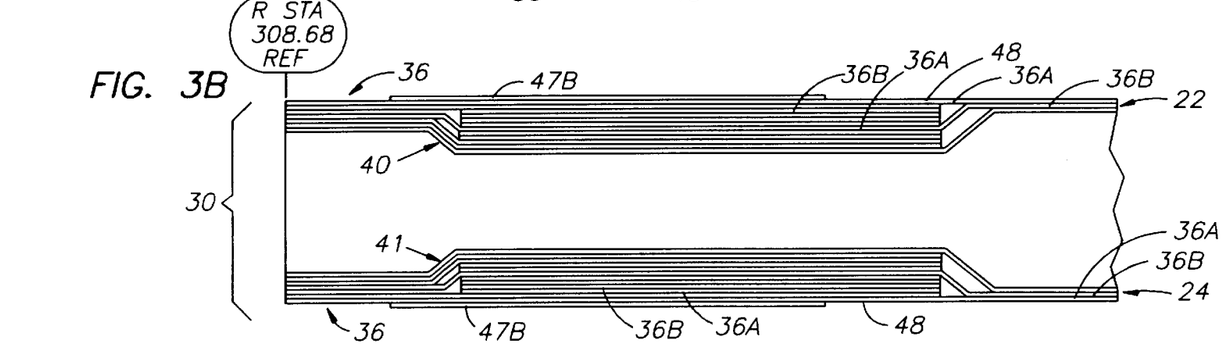
FIG. 3B is a cross-sectional view taken along line B—B of FIG. 3.
Figure 3C:
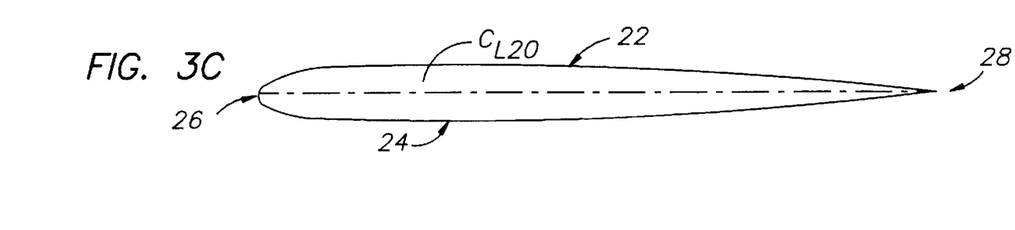
FIG. 3C is a cross-sectional view taken along line C—C of FIG. 3. Reference characters $C_{L20}$ identify the chord line of the composite main fairing.
Figure 3D:
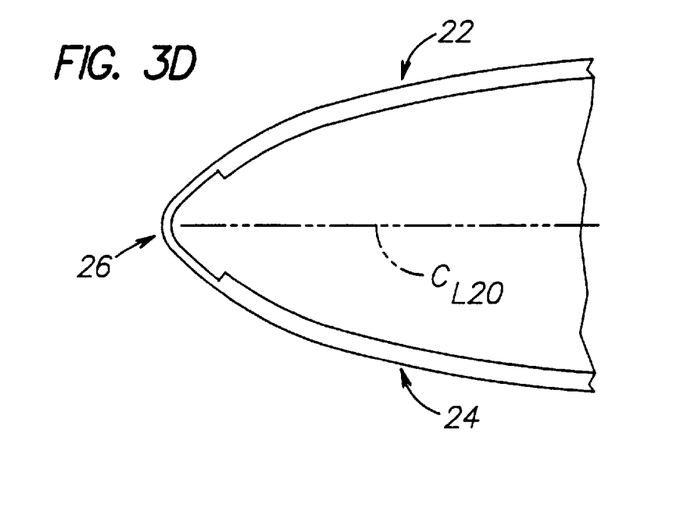
FIG. 3D is a cross-sectional view taken along line D—D of FIG. 3. Reference characters $C_{L20}$ identify the chord line of the composite main fairing.
Figure 3E:
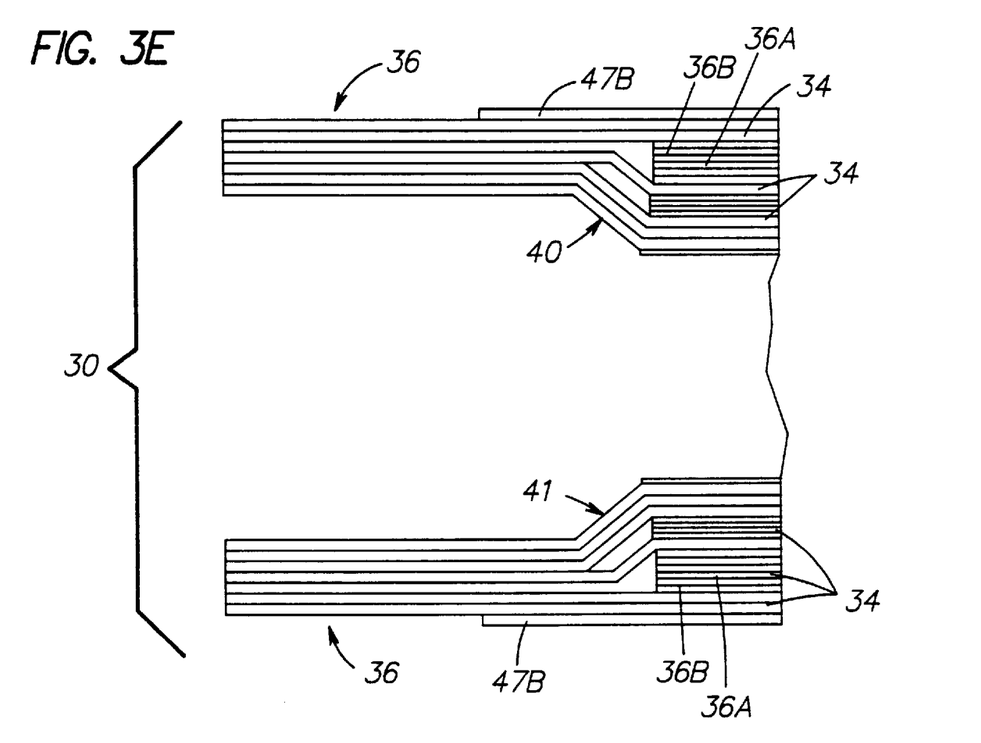
FIG. 3E is a cross-sectional view taken along line E—E of FIG. 3.

The composite main fairing 20 is formed from a plurality of unidirectional plies 34 and a plurality of woven plies 36 in interleaved combination (see FIGS. 3A, 3B, 3E). The unidirectional plies 34 are defined by a single fiber orientation. For the described embodiment of the composite main fairing 20, the defining fiber orientation of the unidirectional plies 34 is −20°. The plurality of woven plies 36 includes first woven plies 36A having first/second fiber orientations and second woven plies 36B having first/second a fiber orientations. For the described embodiment of the composite main fairing 20, the first woven plies 36A have fiber orientations of −20°/+70° and the second woven plies 36B have fiber orientations of −65°/+25°. As an examination of FIGS. 3A, 3B, and 3E reveals, the unidirectional plies 34 are used only in the inboardly extending arm region of composite main fairing 20 adjacent the leading edge 26 (see FIG. 3E). The remainder of the structure of the composite main fairing 20, including the leading edge 26, is formed from an interleaved combination of the first and second woven plies 36A, 36B.

Fabricating the composite main fairing 20 from a graphite-based composite material minimizes the incidence of fatigue cracks in the composite main fairing 20 due to the excellent strength of a graphite-based composite material and its ability to transfer vibratory loads. In addition, a composite main fairing 20 fabricated from graphite-based composite material exhibits superior resistance to crack propagation.

The interleaved first and second woven plies 36A, 36B forming the upper and lower airfoils 22, 24 of the composite main fairing 20 are configured to provide IML chamfered shoulders 40, 41 (see FIGS. 3B, 3E). The IML chamfered shoulders 40, 41 are operative to ensure precise mating of the composite main fairing 20 of the composite tip cap assembly 10 in combination with the outboard end of the helicopter main rotor blade. Further, the interleaved first and second woven plies 36A, 36B forming the upper and lower airfoils 22, 24 of the composite main fairing 20 are configured to provide OML chamfered shoulders 42, 43 (see FIG. 3A) that are operative to facilitate mating of the composite main fairing 20 in combination with the composite closure fairing 50. In addition, the interleaved first and second woven plies 36A, 36B forming the upper and lower airfoils 22, 24 of the composite main fairing 20 are configured to provide IML chamfered shoulders 44, 45 as illustrated in FIG. 3A. The IML chamfered shoulders 44, 45 are operative to facilitate proper positioning of the unitary rib detail 60 internally within the composite main fairing 20.

Figure 4:
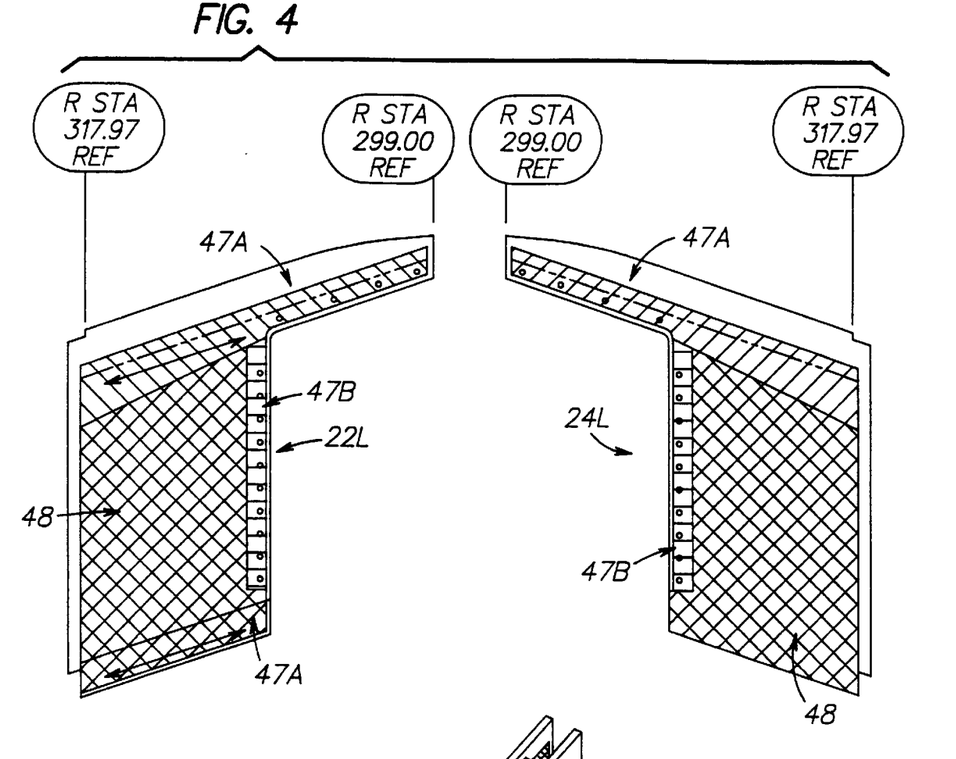
FIG. 4 illustrates the unidirectional and woven plies comprising the composite main fairing assembled in upper and lower airfoil lay-ups.
Figure 5:
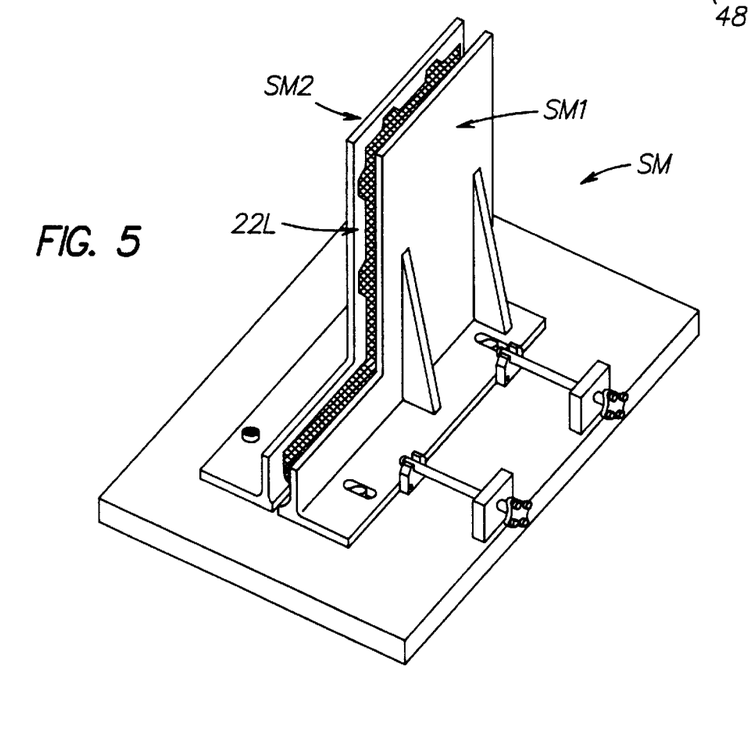
FIG. 5 illustrates the upper and lower airfoil lay-ups of FIG. 4 disposed in an exemplary split-mold assembly that has utility in fabricating the composite main fairing of the composite tip cap assembly.

The described embodiment of the composite main fairing 20 further includes plies 47A, 47B of stainless steel mesh wherein the stainless steel mesh plies 47A have a strand orientation of −20° and the stainless steel mesh plies 47B have a strand orientation of 90° (see FIGS. 3B, 3E, and 4). For the described embodiment, the stainless steel mesh plies 47A, 47B are an AMS5690 Plain Dutch 50×250 stainless steel wire mesh (available from Gerard Daniel & Co., New Rochelle, N.Y.). Optionally, the composite main fairing 20 may include plies 48 of copper mesh (see FIGS. 3B, 4). A copper mesh such as FM99M-029CXMC, available from Cytec Engineered Materials, Havre de Grace, Md., may be used for the copper mesh plies 48.

To fabricate the composite main fairing 20, the unidirectional plies 34 and the first and second woven plies 36A, 36B (as well as the stainless steel plies 47A, 47B, and the copper mesh plies 48, if incorporated) comprising the upper and lower airfoils 22, 24 are assembled in interleaved combination in separate lay-ups 22L, 24L as exemplarily illustrated in FIG. 4. The upper and lower airfoil lay-ups 22L, 24L (the upper airfoil lay-up 24L is obscured in FIG. 4) are assembled in a molding assembly, which, for the described embodiment, is a split mold assembly SM consisting of an adjustable mold half SM1 and a fixed mold half SM2. The adjustable mold half SM1 is movable with respect to the fixed mold half SM2 to facilitate assemblage of the upper and lower airfoil lay-ups 22L, 24L in the split mold assembly SM. As the upper and lower airfoil lay-ups 22L, 24L are assembled in the split mold assembly SM, the first and second woven plies 36A, 36B comprising the leading edge 26 of the composite main fairing 20 are overlapped to form a splice joint in the leading edge 26. An intensifier is added to the splice joint to ensure proper lamination of the first and second woven plies 36A, 36B forming the leading edge 26.

Fabricating the composite main fairing 20 utilizing upper and lower airfoil lay-ups 22L, 24L greatly simplifies the fabrication process, and in addition, optimizes the structural integrity of the composite tip cap assembly 10. Optimization of structural integrity is achieved by forming the splice joint in the leading edge 26 of the composite main fairing 20. Typically, any splice joint in a composite structure is a structurally weak region that is subject to delamination. In the present circumstances, however, structural integrity of the leading edge 26 is maintained since the abrasion strip 70 that is subsequently bonded to OML surface of the leading edge 26, i.e., the abrasion strip 70 overlays the splice joint, provides structural reinforcement, i.e., structural strength, in the leading edge 26 of the composite tip cap assembly 10.

The split mold assembly SM, with the upper and lower airfoil lay-ups 22L, 24L assembly therein as described immediately hereinabove, is subsequently vacuum bagged and cured in an autoclave using conventional techniques and procedures known to those skilled in the art to form a precured composite main fairing 20. Cure cycle parameters, e.g., temperature, pressure, time, depend in large part on the constituent elements of the composite material and are known to those skilled in the art.

The composite closure fairing 50, which is illustrated in FIGS. 6A–6D, is similar in design configuration to the closure fairing described hereinabove for the aluminum tip cap assemblies. The composite closure fairing 50 is defined by an upper airfoil 51, a lower airfoil 52, a leading edge 53, a trailing edge 54, and an inboard integration region 55. The OML surfaces of the upper and lower airfoils 51, 52 define the aerodynamic configuration of the composite closure fairing 50, and the leading, trailing edges 53, 54 in combination define the chord CL50 (see FIGS. 6C, 6D) of the composite closure fairing 50. The inner mold line (IML) surface of the inboard integration region 55 has a configuration that is complementary to the outboard integration region 32 of the composite main fairing 20.

Figures 6A, 6B, 6D:
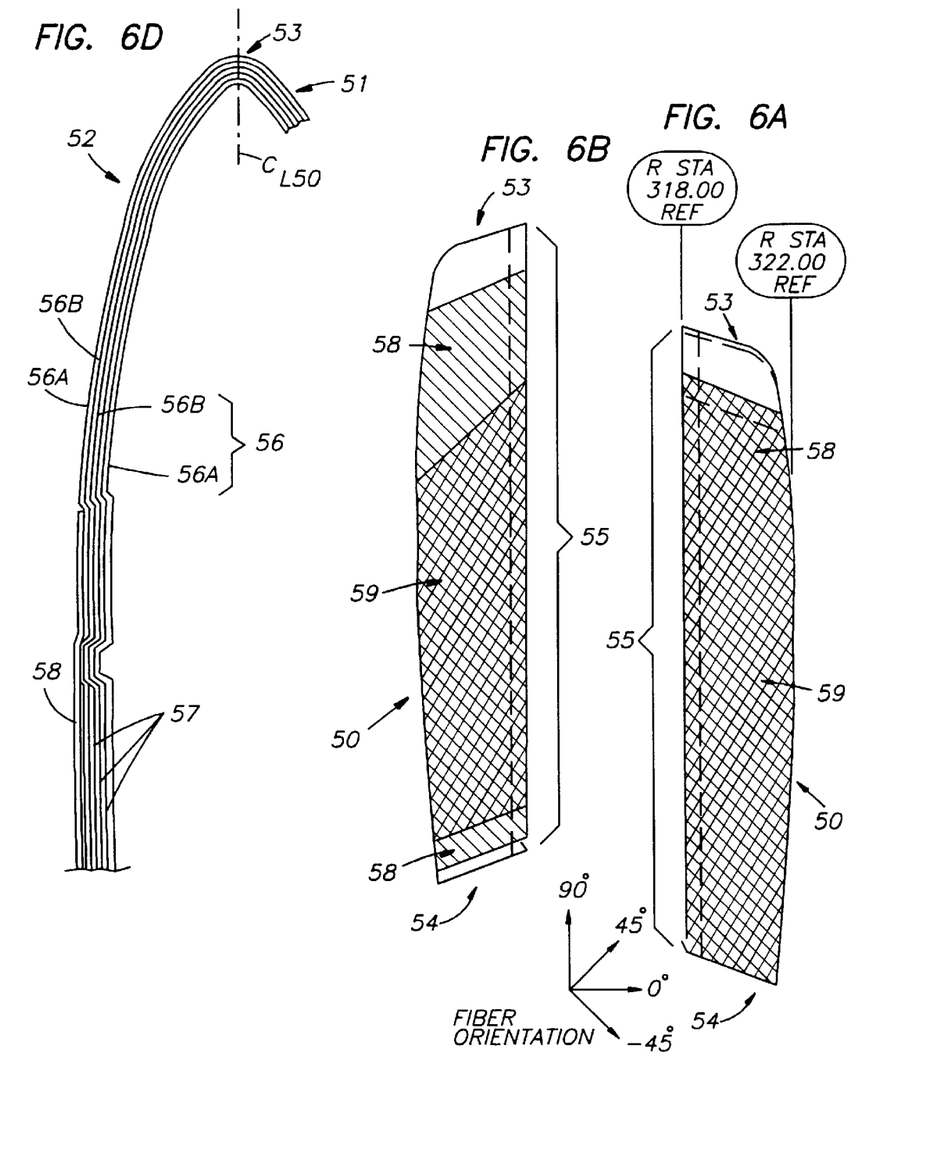
FIG. 6A is a plan view of the upper airfoil surface of the composite closure fairing of the composite tip cap assembly of FIGS. 2A, 2B. Also shown in FIG. 6A is a schematic illustrating the fiber orientations of the plain weave plies forming the composite closure fairing (fiber orientations are referenced to the feathering axis of the helicopter main rotor blade).
FIG. 6B is a plan view of the lower airfoil surface of the composite closure fairing of the composite tip cap assembly of FIGS. 2A, 2B.
FIG. 6D is a partial cross-sectional view of the leading edge of the composite closure fairing of the composite tip cap assembly of FIGS. 2A, 2B.
Figure 6C:
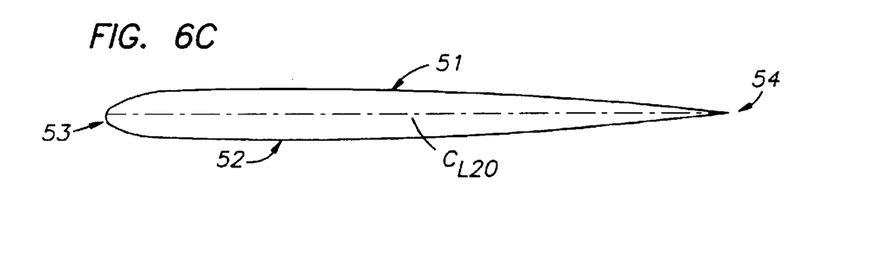
FIG. 6C is an exemplary cross-sectional view of the composite closure fairing of the composite tip cap assembly of FIGS. 2A, 2B.

The composite closure fairing 50 is formed as a unitary structure from a first plurality of woven plies 56 and a second plurality of woven plies 57 in interleaved combination (see FIG. 6D). The first plurality of woven plies 56 includes first woven plies 56A defined by a single fiber orientation and second woven plies 56B defined by a single fiber orientation. For the described embodiment of the composite closure fairing 50, the fiber orientation of the first woven plies 56A is +45°, and the fiber orientation of the second woven plies 56B is −45°. The second plurality of woven plies 57 have first/second fiber orientations. For the described embodiment of the composite closure fairing 50, the woven plies 57 have fiber orientations of 0°/90°.

The composite closure fairing 50 is fabricated from graphite-based composite material as described hereinabove. In addition to the advantages of graphite-based composite material as discussed hereinabove, the fabrication process for the composite closure fairing 50 is enhanced due to the improved pliability and lower cost of graphite-based composite material (as opposed to the use of a KEVLAR®-based composite material for the composite closure fairing of the aluminum tip cap assemblies described hereinabove).

The described embodiment of the composite closure fairing 50 further includes stainless steel mesh plies 58 having a strand orientation of −20° (see FIGS. 6B, 6D). For the described embodiment, the composition and configuration of the stainless steel mesh plies 58 are similar to the stainless steel mesh plies 47A, 47B described hereinabove for the composite main fairing 20. Optionally, the composite closure fairing 50 may include plies 59 of copper mesh (see FIGS. 6A, 6B) of the type described hereinabove with respect to the composite main fairing 20.

To fabricate the composite closure fairing 50, the first and second woven plies 56A, 56B, and the woven plies 57 (as well as the stainless steel mesh plies 58, and the copper mesh plies 59, if incorporated) comprising the composite closure fairing 50 are layed-up in interleaved combination in a conventional molding assembly (not shown), typically a female molding assembly. The layed-up molding assembly is subsequently vacuum bagged and subjected to an autoclave cure to form a precured composite closure fairing 50. The foregoing fabrication techniques, including cure cycle parameters such as temperature, pressure, time, which depend in large part on the constituent elements of the composite material, are well known to those skilled in the art.

Figure 7:
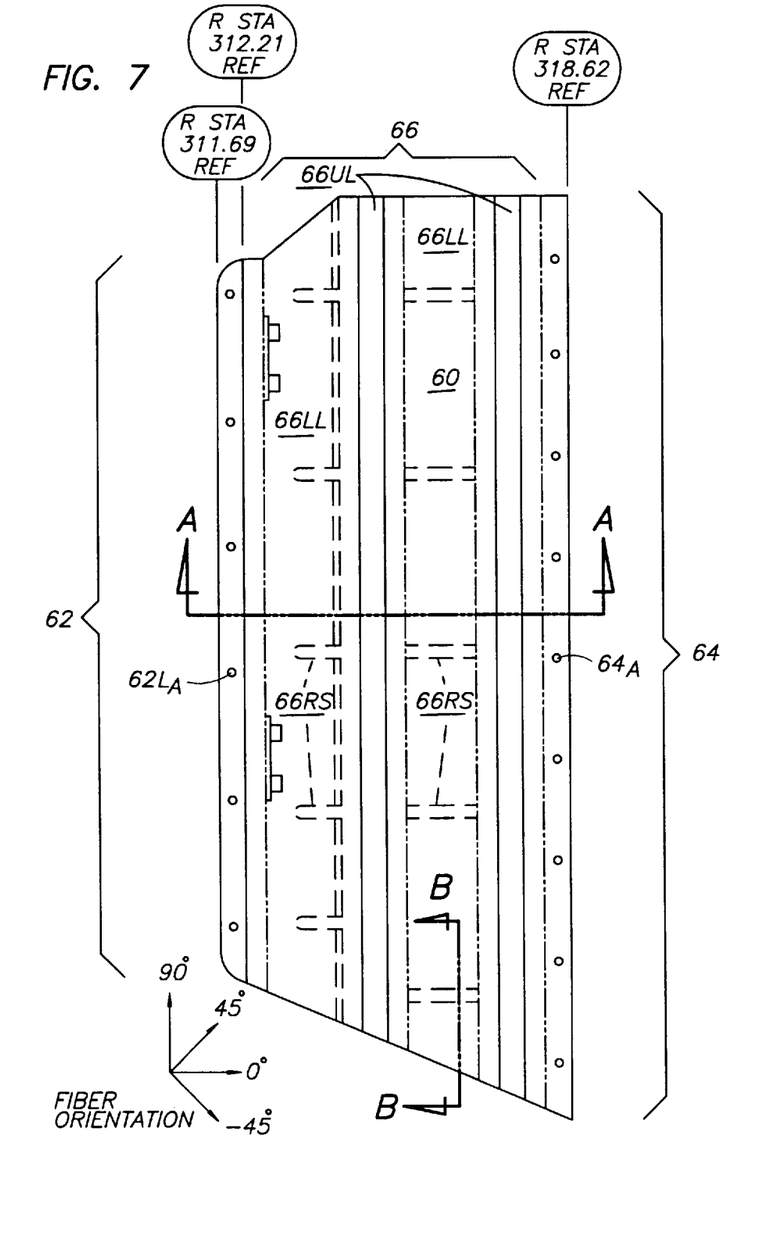
FIG. 7 is a bottom plan view of the unitary composite rib detail of the composite tip cap assembly of FIGS. 2A, 2B. Also shown in FIG. 7 is a schematic illustrating the fiber orientations of the plain weave plies forming the unitary composite rib detail (fiber orientations are referenced to the feathering axis of the helicopter main rotor blade).
Figure 7A:
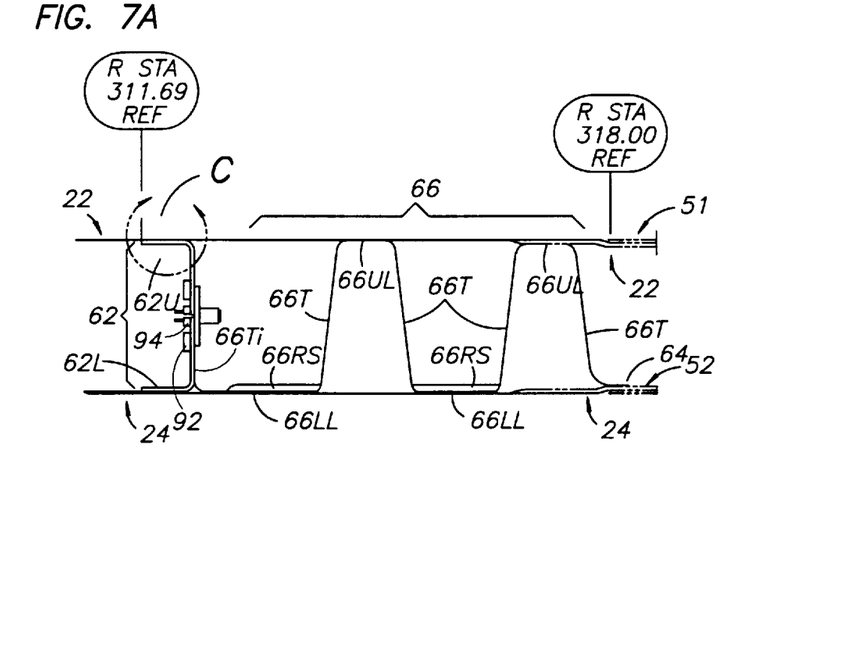
FIG. 7A is a cross-sectional view of the unitary composite rib detail of FIG. 7 taken along line A—A thereof.
Figures 7B, 7C:
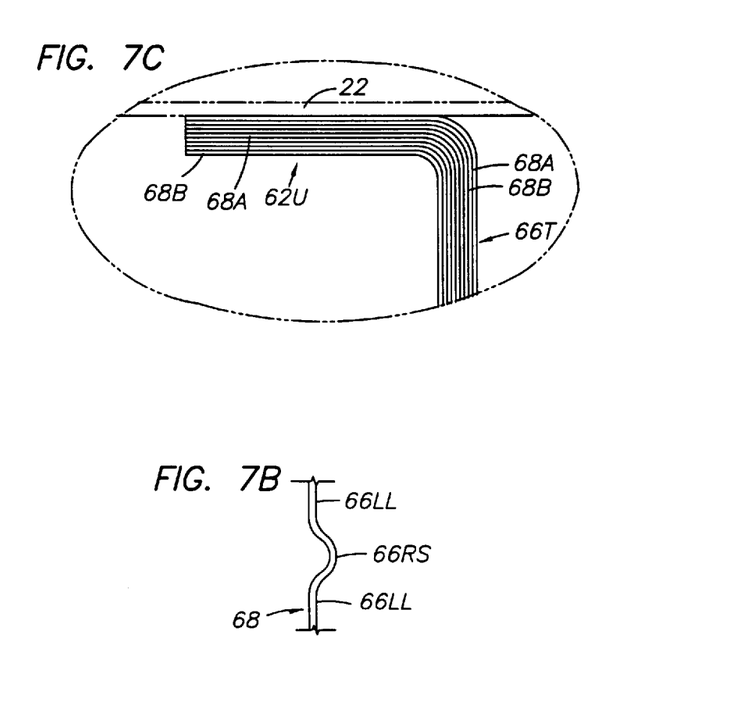
FIG. 7B is a cross-sectional view of the unitary composite rib detail of FIG. 7 taken along line B—B thereof.
FIG. 7C is a cross-section view of the unitary composite rib detail of FIG. 7A at location C thereof.

The unitary composite rib detail 60, which is exemplarily illustrated in FIGS. 7, 7A–7C, has a design dimensions such that the unitary composite rib detail 60 is complementary to the IML surfaces of the composite main fairing 20. The unitary composite rib detail 60 is defined by an inboard interface region 62, an outboard interface region 64, and an intermediate corrugated region 66. The inboard interface region 62 comprises upper and lower flanges 62U, 62L having OML surfaces that abuttingly engage the IML surfaces of the upper and lower airfoils 22, 24 of the composite main fairing 20 as shown in FIG. 7A. The outboard interface region 64 comprises a flange that has an OML surface that abuttingly engages the inner mold line surface of the lower airfoil 24 of the composite main fairing 20. The unitary composite rib detail 60 is positioned internally within the composite main fairing 20 and is operative to provide structural bridging support between the upper and lower airfoils 22, 24.

The intermediate corrugated region 66 comprises transverse webs 66T and upper and lower lateral webs 66UL, 66LL that provide continuity between the transverse webs 66T (see FIGS. 7, 7A). The lower lateral webs 66LL are fabricated to include spaced apart rib stiffeners 66RS (see FIG. 7, 7A) to provide additional structural strength for the intermediate corrugated region 66 of the unitary composite web detail 60. The transverse webs 66T of the intermediate corrugated region 66 are dimensioned so that the OML surfaces of the upper and lower lateral webs 66UL, 66LL abuttingly engage the IML surfaces of the upper and lower airfoils 22, 24, respectively, of the composite main fairing 20.

The unitary composite rib detail 60 is formed from a plurality of woven plies 68. The plurality of woven plies 68 includes first woven plies 68A having first/second fiber orientations and second woven plies 68B having first/second fiber orientations. For the described embodiment of the unitary composite rib detail 60, the first woven plies 68A have fiber orientations of ±45° and the second woven plies 68B have fiber orientations of 0°/90°.

Figure 8:
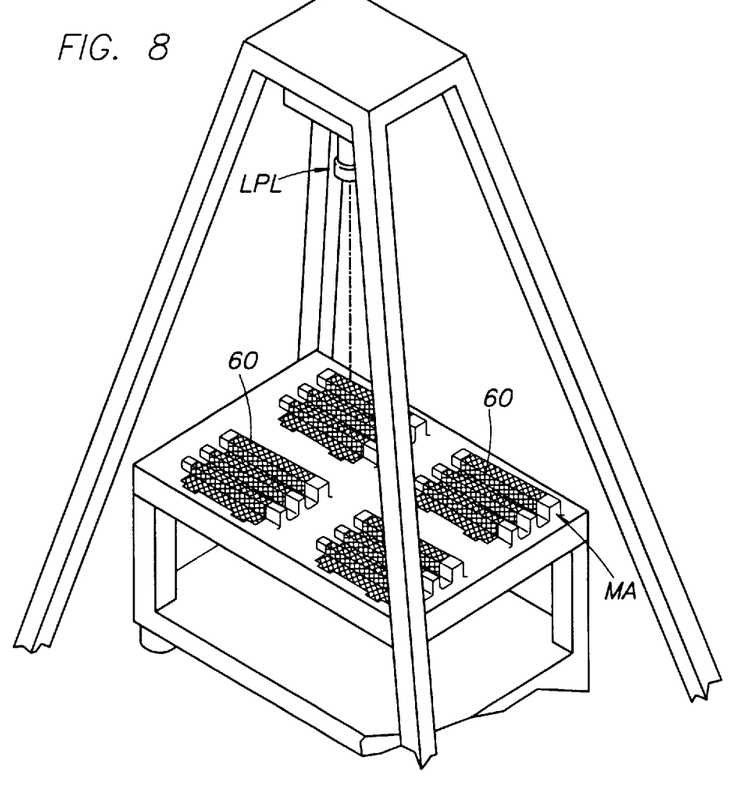
FIG. 8 illustrates a multi-component molding assembly that has utility in fabricating the unitary composite rib detail of the composite tip cap assembly according to the present invention.

To fabricate the unitary composite rib detail 60, the first and second woven plies 68A, 68B comprising the unitary composite rib detail 60 are layed-up in interleaved combination in a conventional molding assembly such as the multi-component molding assembly MA exemplarily illustrated in FIG. 8. The molding assembly MA illustrated in FIG. 8 utilizes a laserply locator LPL to ensure that each first and second woven ply 68A, 68B is properly positioned in the molding assembly MA. The relative simplicity of the configuration of the unitary composite rib detail 60 according to the present invention facilitates the use of a multi-component molding assembly MA so that a plurality of unitary composite rib details 60 may be fabricated simultaneously, thereby decreasing the per unit cost of the rib details 60. The layed-up molding assembly MA is subsequently vacuum bagged and subjected to an autoclave cure to form a precured unitary composite rib detail 60. The foregoing fabrication techniques, including cure cycle parameters such as temperature, pressure, time, which depend in large part on the constituent elements of the composite material, are well known to those skilled in the art.

Figure 9A:
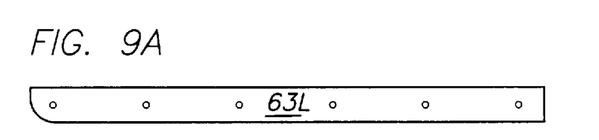
FIGS. 9A–9C depict an alternative embodiment for a lower interface flange for the unitary composite rib detail.
Figure 9B:
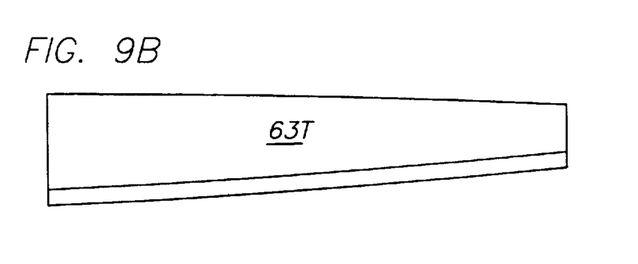
Figure 9C:
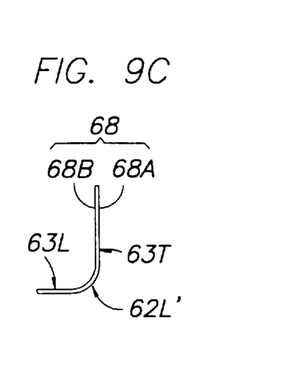

As described hereinabove, the upper and lower flanges 62U, 62L defining the inboard interface region 62 of the unitary composite rib detail 60 are fabricated as integral extensions of the inboardmost transverse web 66Ti (see FIG. 7A). Alternatively, the lower flange may be fabricated as a separate element and integrated in combination with the inboardmost transverse web. FIGS. 9A–9C illustrate a lower flange 62L' fabricated as a separate element that comprises a tranverse leg 63T and a lateral leg 63L. The lower flange 62L' is comprised of first and second woven plies 68A, 68B as described hereinabove that are layed-up in a conventional mold in abutting combination with the inboardmost transverse web, vacuum bagged, and autoclave cured using conventional composite fabrication techniques and cure cycle parameters such as pressure, temperature, and time, to form a cured lower flange 62L' that is an integral element of the unitary composite rib detail 60.

The design configuration of the unitary composite rib detail 60 according to the present invention facilitates the integration of balance weights in combination with the composite tip cap assembly 10 to statically and dynamically balance the composite tip cap assembly 10. Referring to FIGS. 7, 7A, one or more nutplates 90, i.e., a plate with a captured nut, are bonded in combination with the inboardmost transverse web 66Ti. Balance weights 92 are then secured to the inboardmost transverse web 66Ti by means of attachment screws 94 that thread into the respective nutplates 90.

The abrasion strip 70 is exemplarily illustrated in FIGS. 2A, 2B and is similar in configuration and material to the abrasion strips currently used in the aluminum tip cap assemblies described hereinabove for the UH-60 BLACK HAWK® and SH-60 SEAHAWK® helicopters. The IML surface of the abrasion strip 70 is complementary to the OML surfaces of the leading edges 26, 53 of the composite main and closure fairings 20, 50, respectively. The abrasion strip 70 is preferably fabricated from nickel, which has superior abrasion-resistance characteristics for helicopter applications, using any conventional fabrication technique.

To assemble the composite tip cap assembly 10. the cured unitary composite rib detail 60 is first integrated in combination with the cured composite main fairing 20 by bonding with a suitable high temperature adhesive of a type known to those skilled in the art (such a high temperature adhesive typically cures at a temperature of about 250° F.). Proper positioning of the cured unitary composite rib detail 60 in combination with the composite main fairing 20 is achieved by the abutting engagement of the OML surface of the outboard interface flange 64 with the IML surface of the outboard integration region 32 of the lower airfoil 24 of cured composite main fairing 20. Optionally, alignment apertures $62L_A$, $64_A$ may be formed in one or both of the respective interface flanges 62L, 64 of the unitary composite rib detail 60 as illustrated in FIG. 7. Corresponding alignment apertures would be formed in the lower airfoil 22 of the composite main fairing 20 (only the corresponding alignment apertures 33 are illustrated—see FIG. 3), and alignment pins inserted through such alignment apertures to properly position the unitary composite rib detail 60 internally within the composite main fairing 20. While the use of alignment pins as described immediately hereinabove makes the fabrication process more complex, it will be appreciated that the optional use of alignment pins to properly position the unitary composite rib detail 60 in combination with the composite main fairing 20 is by far less labor intensive than the fabrication of the aluminum tip cap assembly described hereinabove. Each C-shaped rib member of the prior art aluminum tip cap assembly must be positioned using alignment pins. For the present invention, in contrast, alignment pins are only required for one or both of the respective interface flanges 62L, 64 of the unitary composite rib detail 60. After the unitary composite rib detail 60 has been bonded in combination with the composite main fairing 20 the alignment pins are removed.

Next, the composite closure fairing 50 is bonded in combination with the outboard integration region 32 of the composite main fairing using a suitable high temperature adhesive of the a type known to those skilled in the art. Finally, the abrasion strip 70 is bonded in combination with the leading edges 26, 53 of the composite main and closure fairings 20, 50, respectively, using a suitable high temperature of a type known to those skilled in the art.

The composite tip cap assembly 10 according to the present invention comprises only four primary components (in contrast to the aluminum tip cap assemblies for the UH-60 BLACK HAWK® and SH-60 SEAHAWK® helicopters described hereinabove which have sixteen primary components), thereby simplifying both the manufacture and assemblage of the composite tip cap assembly 10. The simplification in the manufacturing and assemblage of the composite tip cap assembly 10 results in a significant reduction in the per unit cost of the composite tip cap assembly 10 as compared to the prior art tip cap assemblies described above (a per unit cost reduction of close to fifty percent (50%) is achieved).

A variety of modifications and variations of the present invention are possible in light of the above teachings. It is therefore to be understood that, within the scope of the appended claims, the present invention may be practiced otherwise than as specifically described hereinabove.

What is claimed is:

1. A composite tip cap assembly for a helicopter main rotor blade, comprising:

a composite main fairing having an arm region which is adapted to mount to a forward portion of the main rotor blade, and an outward region, said arm region being formed from a ply lay-up including
a plurality of unidirectional plies having a fiber orientation, and
a plurality of woven plies including first woven plies having first/second fiber orientations and second woven plies having first/second fiber orientations, the fiber orientations of the second woven plies being different than the fiber orientations of the first woven plies,
said plurality of unidirectional plies, said first woven plies, and said second woven plies being interleaved in combination to form the ply lay-up of the arm region of said composite main fairing;

unitary composite rib detail internally integrated in combination with said composite main fairing;

a composite closure fairing integrated in combination with said composite main fairing; and an abrasion strip integrated in combination with said composite main fairing and said composite closure fairing.

2. The composite tip cap assembly of claim 1 wherein:
said fiber orientation of said unidirectional plies is −20°;
said first/second fiber orientations of said first woven plies are −20°/+70°; and
said first/second fiber orientations of said second woven plies are −650°/+25°.

3. The composite tip cap assembly of claim 1 wherein said plurality of unidirectional plies and said plurality of woven plies are graphite-based composite prepregs.

4. The composite tip cap assembly of claim 1 wherein said unitary composite rib detail comprises:
an inboard interface region;
an outboard interface region; and
a corrugated region intermediate and contiguous with said inboard and outboard interface regions.

5. The composite tip cap assembly of claim 1 wherein said unitary composite rib detail comprises a plurality of woven plies including first woven plies having first/second fiber orientations and second woven plies having first/second fiber orientations, said first woven plies and said second woven plies being interleaved in combination to form said unitary composite rib detail.

6. The composite tip cap assembly of claim 5 wherein said plurality of woven plies are graphite-based composite prepregs.

7. The composite tip cap assembly of claim 1 wherein said composite closure fairing comprises:
a first plurality of woven plies including first woven plies defined by a single fiber orientation and second woven plies defined by a single fiber orientation; and
a second plurality of woven plies having first/second fiber orientations;
said first and second pluralities of woven plies being interleaved in combination to form said composite closure fairing.

8. The composite tip cap assembly of claim 7 wherein said first and second pluralities of woven plies are graphite-based composite prepregs.

9. The composite tip cap assembly of claim 1 wherein said first/second fiber orientations of said first woven plies are −20°/+70°; and said first/second fiber orientations of said second woven plies are −65°/+25°.

10. The composite tip cap assembly of claim 1 wherein the outward region is formed from a ply lay-up including a plurality of woven plies including first woven plies having first/second fiber orientations and second woven plies having first/second fiber orientations, the fiber orientations of the second woven plies being different than the fiber orientations of the first woven plies, said plurality of first woven plies and said second woven plies being interleaved in combination to form the ply lay-up of the outward region of said composite main fairing.

11. A composite tip cap assembly for a helicopter main rotor blade, comprising:

a composite main fairing;

a unitary composite rib detail internally integrated in combination with said composite main fairing, said unitary composite rib detail including
an inboard interface region,
an outboard interface region, and
a corrugated region intermediate and contiguous with said inboard and outboard interface regions, said intermediate corrugated region including a plurality of transverse webs and a plurality of upper and lower lateral webs contiguous with said transverse webs,
wherein said inboard interface region comprises upper and lower flanges contiguous with and extending inboardly from said inboardmost transverse web, and wherein said outboard interface region comprises a lower flange contiguous with and extending outboardly from said outboardmost transverse web;

a composite closure fairing integrated in combination with said composite main fairing; and abrasion strip integrated in combination with said composite main fairing and said composite closure fairing.

12. A composite tip cap assembly for a helicopter main rotor blade, comprising:

a composite main fairing;

a unitary composite rib detail internally integrated in combination with said composite main fairing, said unitary composite rib detail comprises a plurality of woven plies including first woven plies having first/second fiber orientations and second woven plies having first/second fiber orientations, said first woven plies and said second woven plies being interleaved in combination to form said unitary composite rib detail, wherein said first/second fiber orientations of said first woven plies are +45° and wherein said first/second fiber orientations of said second woven plies are 0°/90°;

a composite closure fairing integrated in combination with said composite main fairing; and an abrasion strip integrated in combination with said composite main fairing and said composite closure fairing.

13. A composite tip cap assembly for a helicopter main rotor blade, comprising:

a composite main fairing;

a unitary composite rib detail internally integrated in combination with said composite main fairing;

a composite closure fairing integrated in combination with said composite main fairing, said composite closure fairing including a first plurality of woven plies including first woven plies defined by a single fiber orientation and second woven plies defined by a single fiber orientation, and a second plurality of woven plies having first/second fiber orientations, said first and second pluralities of woven plies being interleaved in combination to form said composite closure fairing; wherein said defining fiber orientation of said first woven plies is +45°, said defining fiber orientation of said second woven plies is −46°, and said first/second fiber orientations of said second plurality of woven plies are 0°/90°; and an abrasion strip integrated in combination with said composite main fairing and said composite closure fairing.

* * * * *